J. C. BABB.
Churns.

No. 153,518. Patented July 28, 1874.

WITNESSES:
A. Bennemendorf
O. Sedgwick

INVENTOR:
J. C. Babb
BY Munn & Co
ATTORNEYS.

UNITED STATES PATENT OFFICE.

JAMES C. BABB, OF KNOWLTON, WISCONSIN.

IMPROVEMENT IN CHURNS.

Specification forming part of Letters Patent No. 153,518, dated July 28, 1874; application filed June 13, 1874.

*To all whom it may concern:*

Figure 1:
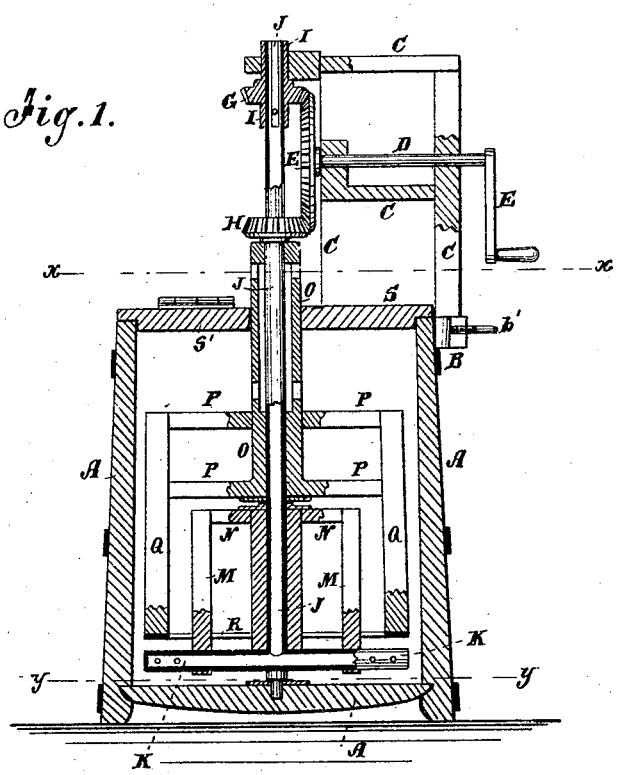
Figure 2:
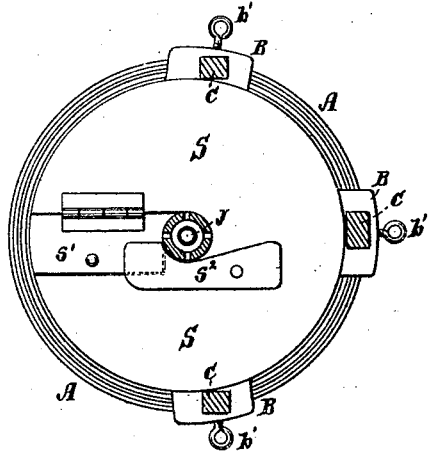
Figure 3:
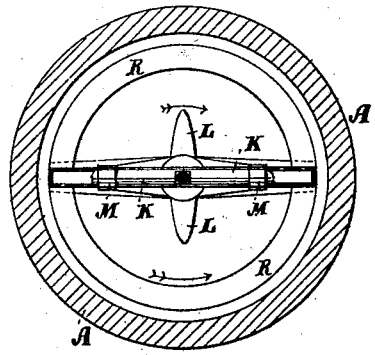

Be it known that I, JAMES C. BABB, of Knowlton, in the county of Marathon and State of Wisconsin, have invented a new and useful Improvement in Churns, of which the following is a specification:

Figure 1 is a vertical section of my improved churn. Fig. 2 is a horizontal section of the same, taken through the line $x\,x$, Fig. 1, and looking downward. Fig. 3 is a horizontal section of the same, taken through the line $y\,y$, Fig. 1, and looking upward.

Similar letters of reference indicate corresponding parts.

My invention has for its object to furnish an improved churn, simple in construction, convenient in use, easily operated, and effective in operation, bringing the butter quickly and thoroughly.

The invention consists in the combination of the inner tubular shaft, provided with the perforated tubular cross-bar, the wings, and the paddles, and the outer tubular shaft, provided with the paddles and the air-holes, with the churn body, the gear-wheels, the crank-shaft, and the detachable frame, as hereinafter fully described.

A represents the body of the churn, which is made in the ordinary shape and manner, and of any desired size. To the sides of the upper part of the churn-body A are attached three sockets, B, to receive the lower ends of the posts of the frame C, which are secured in said sockets by set-screws $b'$, so that the said frame can be readily detached when desired. In bearings in the middle part of the frame C revolves a shaft, D, to the outer end of which is attached the crank E, by means of which the churn is operated. To the inner end of the shaft D is attached a large bevel-gear wheel, F, the teeth of which mesh into the teeth of the two small bevel-gear wheels G H. The bevel-gear wheel G is placed at the upper part of the bevel-gear wheel F, and is attached to a short tube, I, which is swiveled to the upper part of the frame C, and is provided with a cross-pin to enter a longitudinal slot in the upper end of the tubular shaft J, the cavity of which communicates with the cavity of a tubular cross-bar, K, attached to its lower end. The lower end of the tubular shaft J is provided with a pivot, which works in a step or socket attached to the center of the bottom of the churn-body A. In the opposite and rear sides of the ends of the tubular cross-bar K are formed a number of small holes, to allow the air drawn in through the tubular shaft J and cross-bar K to escape into the milk. To the opposite sides of the lower part of the tubular shaft J, and at right angles to the tubular cross-bar K, are attached two beveled or wedge-shaped wings, L, to throw the milk from the center toward the sides of the churn-body A. To the tubular cross-bar K, about midway between its center and ends, are attached the lower ends of the upright bars M, the upper ends of which are attached to the ends of a short cross-bar, N, attached to the said tubular shaft J, and which serve as paddles to agitate the milk. The small bevel-gear wheel H is placed at the lower side of the gear-wheel F, and is attached to the upper end of the tubular shaft O, which is made of such a size that the tubular shaft J may pass through and revolve in it. The lower end of the tubular shaft O rests and revolves upon a shoulder formed upon the tubular shaft J, at the point where the cross-bar, N is attached to it. To the lower part of the tubular shaft O are attached two cross-bars, P, placed the one directly above and at a little distance from the other, as shown in Fig. 1. To the outer ends of the cross-bars P are attached the upper parts of two upright bars, Q, the lower ends of which are attached to a ring, R, by which they are held in their proper relative position. The upper part of the cavity of the tubular shaft O is enlarged to form an air-chamber, into which the air and gas from the upper part of the churn-body A enter through holes $o^1$ in the said shaft O, just above the upper cross-bar P, and from which said air and gas escape through the holes $o^2$ in the said shaft O, above the top of the churn-body A, and below the gear-wheel H. By this construction a complete circulation of air is established through the milk being churned. S is the cover, which fits into the mouth of the churn-body A, and has a slot formed in one side, leading from its edge to its center, and of such a size as to allow the shaft O to pass through it, so that the cover may be conveniently put on and taken off, as required. The slot in the cover S is closed by a small door, $s^1$, hinged at one edge to the said cover S, so that it can be readily turned back when required to allow the cover to be put on and taken off. The door $s^1$ is held in place, when closed, by a button, $s^2$, pivoted to the cover S, in such a position that it can be readily turned over the free edge of the said door $s^1$. By this construction, when the crank E is turned, the shafts J O and their attachments will be revolved in opposite directions, the milk will be thrown into violent agitation, and a current of air will be forced through it, bringing the butter in a very short time, and developing all the butter there may be in the milk.

Having thus described my invention, I claim as new, and desire to secure by Letters Patent—

The combination of the inner tubular shaft J, provided with the perforated tubular cross-bar K, the wings L, and the paddles M N, and the outer tubular shaft O, provided with the paddles P Q R and the holes $o^1$ $o^2$, with the churn-body A, the gear-wheels G H F, the crank-shaft D, and the detachable frame C, substantially as herein shown and described.

JAMES C. BABB.

Witnesses:
   JAMES VOUGHT,
   ALOIS STARK.